March 14, 1967   O. W. WILCOX ET AL   3,308,815
CONNECTOR REGULATOR FOR BREATHING MASK
Filed Aug. 10, 1964   2 Sheets-Sheet 1

ORLAND W. WILCOX
JAMES A. STAPENHILL
INVENTORS

BY

Beehler & Arant
ATTORNEYS

March 14, 1967  O. W. WILCOX ET AL  3,308,815
CONNECTOR REGULATOR FOR BREATHING MASK
Filed Aug. 10, 1964  2 Sheets-Sheet 2

ORLAND W. WILCOX
JAMES A. STAPENHILL
INVENTORS

BY

Beehler & Arant
ATTORNEYS

United States Patent Office 3,308,815
Patented Mar. 14, 1967

3,308,815
CONNECTOR REGULATOR FOR BREATHING MASK
Orland W. Wilcox and James A. Stapenhill, Sierra Madre, Calif., assignors to Sierra Engineering Company, Sierra Madre, Calif., a corporation of California
Filed Aug. 10, 1964, Ser. No. 388,615
4 Claims. (Cl. 128—142)

The invention has reference to aviators' breathing equipment and is more particularly directed to a connector or manifold through which air passes from one source or another to the mask.

A commonly employed expedient for an aviator's breathing supply is the manifold or connector which is in the oxygen line to the mask. This is a three-way connector having one fitting to which the oxygen line is attached from the regulated oxygen supply of the airplane, another fitting to which an oxygen line is connected from a portable flask which is strapped to the aviator's person and a third connection to the hose line of the mask itself. When the aviator bails out the connection to the stationary oxygen supply line of the airplane must be capable of being broken automatically. This is accomplished by merely pulling the connection loose from the supply line. When this happens a check valve in the connector is enabled to seat, thereby to prevent loss of oxygen to the atmosphere which is supplied by the portable bottle. One outstanding disadvantage in automatic disconnects heretofore available has been the necessity for a straight line pull between the connector and the permanent supply line. Although some angular displacement of as much as thirty degrees of misalignment can be tolerated if the misalignment is any more than this amount the disconnection function may result in damage to the check valve or may be prevented entirely. Either result can readily be disastrous to the aviator if the bailing out takes place at a very high altitude.

It is therefore among the objects of the invention to provide a new and improved connector which will not become damaged when the angle of misalignment far exceeds 30 degrees and which also will not impair the proper operation of the check valve under such circumstances.

Another object of the invention is to provide a new and improved disconnection device which will allow proper disconnection and operation of the check valve device at any one of a variety of different angles all of which exceed the permissive angle in equipment heretofore available.

Still another object of the invention is to provide a new and improved connector wherein a positive guide is provided for the check valve during disconnection.

Still another object of the invention is to provide a very simple, rugged manifold disconnection device which can tolerate many different angles of disconnection, even as much as an angle of 180 degrees, which will not get out of order because of its rugged construction and which is compact so as to occupy no more than a minimum amount of space.

Also included among the objects of the invention is to provide a new and improved connector which is substantially standard in most respects so that it can be connected in existing oxygen equipment without necessitating any change.

With these and other objects in view, the invention consists in the construction, arrangement and combination of the various parts of the device, whereby the objects contemplated are attained, as hereinafter set forth, pointed out in the appended claims and illustrated in the accompanying drawings.

Figure 1:
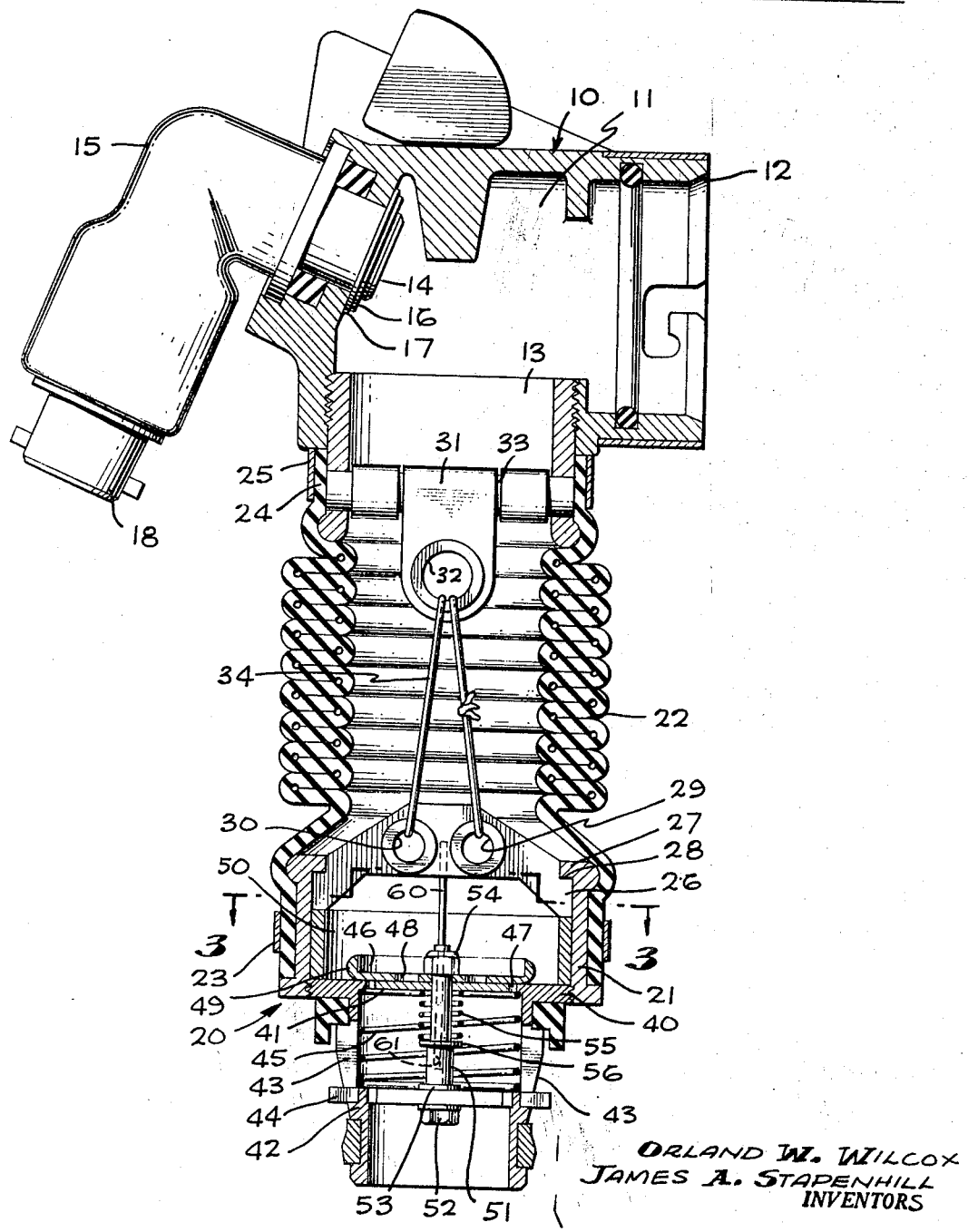
FIGURE 1 is a longitudinal sectional view of the device wherein all hose lines have been removed.

In an embodiment of the invention which has been chosen primarily by way of example there is shown what for convenience is identified as a crossover fitting comprising a body 10 providing a chamber 11 which is supplied by three ports, namely a port 12 through which oxygen flows to a hose line (not shown) to the mask, a port 13 through which oxygen enters the chamber 11 from the main regulated oxygen supply line of the airplane, and a port 14 through which oxygen reaches the chamber from a portable bottle (not shown) which is normally strapped to the person of the aviator. For convenience in identifying the port 14 there is shown a bailout supply elbow 15 secured in position by a retaining ring 16 applied over shim 17. A bayonet type fixture 18 is designed to have the hose line attached to it.

Located below the body 10 is a connector assembly indicated generally by the reference character 20 and consisting of a variety of parts. These parts include a lower hose collar 21 to which is attached a convoluted elastic hose 22 with the assistance of a hose clamp 23. The upper end of the convoluted elastic hose is attached to an upper hose collar 24 by means of a hose clamp 25, the upper hose collar 24 having a threaded engagement with the lower portion of the body 10 and a passage therethrough providing the port 13 heretofore made reference to.

Also included in the connector assembly 20 is a bail or cord locator 26 anchored to the lower hose collar 21 by engagement of a flange 27 over a shoulder 28. In the bail 26 are two holes 29 and 30. Above these holes in a cord locator 31 is another hole 32. The cord locator 31 is pivotally secured by means of a pin 33 to the upper hose collar 24. A restraint lanyard or cord 34 is run through the holes 29, 30 and 32, drawn tight and knotted in position. The lanyard is preferably one of such material that will not readily stretch once it is drawn tight. Secured as described the lanyard provides a means for drawing the convoluted elastic hose into the collapsed position shown in FIGURE 1. The attachment however is flexible and permits the body 10 to be tilted with respect to the connector assembly 20 in virtually any direction at almost any angle without pulling parts out of position and from which location the body and connector assembly can be returned to the position of alignment shown in FIGURE 1. The triangular raised relationship provided by locating the holes 29, 30 and 32 as shown materially assists in holding the parts in normal alignment and the flexible character of the restraint lanyard, the elastic hose, and the swivel mounting of the cord locator 31 permits the angular displacement mentioned.

Figure 2:
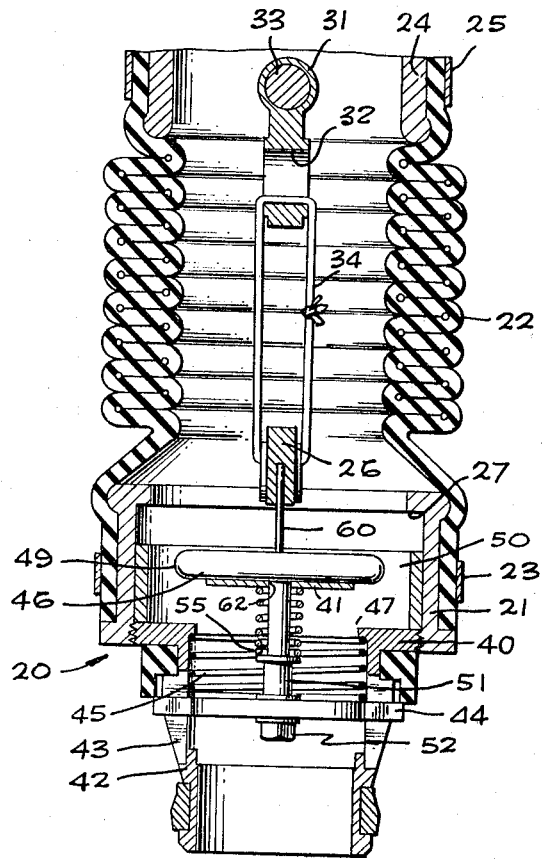
FIGURE 2 is a fragmentary longitudinal sectional view of the lower portion of the device in a direction at right angles to the view of FIGURE 1.
Figure 3:
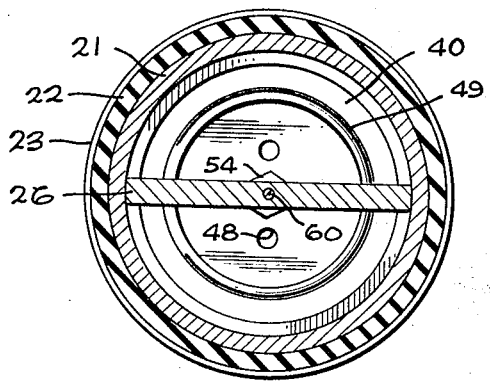
FIGURE 3 is a cross-sectional view on the line 3—3 of FIGURE 1.

Further comprising parts of the connector assembly 20 is the relief valve member 40, the relief valve disc 41 and the connector extension 42. In the connector extension are slots 43 through which extends an actuator 44 in a position so that it can shift in an axial direction. This portion of the device is substantially standard. When the oxygen supply hose from the stationary oxygen supply of the airplane is applied to the extension the actuator 44 is pushed upwardly as shown in FIGURES 1 and 2 by an appropriate portion of the connecting hose, the actuator being moved against tension of a spring 45. When the hose is removed the spring moves the actuator downwardly to the position shown in FIGURE 1.

A valve element 46 overlies the relief valve disc 41 so that the valve element in the position of parts of FIGURE 1 closes valve passages 47 through the disc 41. Valve passages 48 in the valve element are also closed. Improved flow through this portion of the device is provided by a rounded edge 49 on the valve element 46 when air enters a chamber 50 on its way through the interior of the convoluted elastic hose 22.

An actuator shaft 51 is connected to the actuator 44 by means of a nut 52 drawn against a shoulder 53. At the other end of the actuator shaft 51 a nut 54 draws downwardly against the valve element 46. A relief valve spring 55 acting between a washer 56 and the under side of the relief valve disc 41 serves normally to hold the valve element 46 yieldably in the elevated position of FIGURE 2.

In order to guide movement of the valve element 46 at all times there is provided a guide pin 60 which is anchored centrally within the bail 26. The guide pin 60 is slidably received in a guide bore 61 in the actuator shaft 51. As a result of the presence and operation of the guide pin and bore the valve element 46 will slide at all times in guided position offered by the pin 60 and consequently will always reseat properly and precisely upon the relief valve member thereby to effectively and tightly close the valve passages 47 and 48 when the parts are in the position shown in FIGURE 1. By making the spring 45 more powerful than the relief valve spring 55 the valve element 46 will always be unseated when the oxygen supply hose at this location is attached so that there will be an unobstructed flow of oxygen through the connector assembly 20 controlled by other equipment not forming a part of the invention.

The guidance provided by the guide pin 60 in addition to the guiding experienced by movement on the actuator shaft through a guide aperture 62 in the relief valve disc 41 makes certain of positive and precise action of the valve element 46 at all times and this feature coupled with the restraint lanyard connection heretofore described gives assurance of positive disconnection whenever the need arises and at the same time assures effective closing of the valve element 46.

While the invention has herein been shown and described in what is conceived to be the most practical and preferred embodiment, it is recognized that departures may be made therefrom within the scope of the invention which is not to be limited to the details disclosed herein but is to be accorded the full scope of the claims so as to embrace any and all equivalent devices.

Having described the invention, what is claimed as new in support of Letters Patent is:

1. A releasable connector for installation between a relatively stationary oxygen supply and a crossover fitting interconnecting a breathing mask and a portable oxygen supply system comprising a first hose connecting means for connection to the crossover fitting, a supply line fitting having a second hose connecting means thereon and a flexible hose connected between said hose connecting means, a bracket in said first hose connecting means, a bail bracket in said second hose connecting means, locators substantially centrally disposed in said hose connecting means and a flexible connection attaching said locators to each other, a valve seat in said supply line fitting, a valve element seated on said seat, an actuator member for the valve element, and complementary axially operable guide members for said valve element located respectively on said bail bracket and said actuator, whereby to confine movement of said valve element to an axial direction for all angular positions of said hose connection means relative to each other.

2. A releasable connector for installation between a relatively stationary oxygen supply and a crossover fitting interconnecting a breathing mask and a portable oxygen supply system comprising a first hose connecting means for connection to the crossover fitting, a supply line fitting having a second hose connecting means thereon and a flexible hose connected between said hose connecting means, a bracket in said first hose connecting means, a bail bracket in said second hose connecting means, locators substantially centrally disposed in said hose connecting means and a flexible connection attaching said locators to each other, a valve seat in said supply line fitting, a valve element seated on said seat, an actuator member for the valve element, and complementary axially operable guide members for said valve element located respectively on said bail bracket and said actuator, one of said guide members comprising a pin in a centrally fixed location, the other of said guide members comprising a bore having said pin slidably mounted therein whereby to confine movement of said valve element to an axial direction for all angular positions of said hose connection means relative to each other.

3. A releasable connector for installation between a relatively stationary oxygen supply and a crossover fitting interconnecting a breathing mask and a portable oxygen supply system comprising a first hose connecting means for connection to the crossover fitting, a supply line fitting having a second hose connecting means thereon and a resilient flexible hose connected between said hose connecting means, a bracket in said first hose connecting means, a bail bracket in said second hose connecting means, locators substantially centrally disposed in said hose connecting means, and a flexible connection attaching said locators to each other, a valve seat in said supply line fitting, a valve element seated on said seat, a spring pressed actuator having an axial guide bore therein axially movable in said supply line fitting, said actuator being attached to said valve element and spring means acting between said valve element and said supply line fitting to hold the valve element in seated position, and a guide for said valve element comprising a pin in a centrally fixed location on said bracket, said pin having an axially slidable mounting in said guide bore whereby to confine movement of said valve element to an axial direction for all angular positions of said hose connection means relative to each other.

4. A releasable connector for installation between a relatively stationary oxygen supply and a crossover fitting interconnecting a breathing mask and a portable oxygen supply system comprising a first hose connecting means for connection to the crossover fitting, a supply line fitting having a second hose connecting means thereon and a convoluted resilient flexible hose connected between said hose connecting means, a bracket pivotally supported for movement about a transverse axis in said first hose connecting means, said bracket having a single cord locator centrally disposed in said first hose connecting means having a double cord locator substantially centrally disposed in said second hose connecting means, and a flexible cord attaching said locators to each other, a valve seat in said supply line fitting, a valve element seated on said seat, a spring pressed actuator having an axial guide bore therein axially movable in said supply line fitting, said actuator being attached to said valve element, and spring means acting between said valve element and said supply line fitting to hold said valve element in seated position, and a guide for said valve element comprising a pin in a centrally fixed location on said bracket, said pin having an axially slidable mounting in said guide bore whereby to confine movement of said valve element to an axial direction for all angular positions of said hose connection means relative to each other.

References Cited by the Examiner

UNITED STATES PATENTS

| | | | |
|---|---|---|---|
| 2,839,054 | 6/1958 | Kindred | 128—142 |
| 2,945,501 | 7/1960 | Bloom | 128—142 |
| 2,999,497 | 9/1961 | Hamilton | 128—142 |

ROBERT E. MORGAN, *Acting Primary Examiner.*

K. L. HOWELL, *Assistant Examiner.*